June 3, 1969  A. J. HUNDT  3,447,261

PROPAGATION DEVICE

Filed Oct. 5, 1966  Sheet 1 of 2

United States Patent Office 3,447,261
Patented June 3, 1969

3,447,261
PROPAGATION DEVICE
Archibald John Hundt, Castle Hill, New South Wales, Australia, assignor to Walter Barr Pty. Limited, Enfield, New South Wales, Australia, a corporation of New South Wales
Filed Oct. 5, 1966, Ser. No. 584,451
Claims priority, application Australia, June 28, 1966, 7,582/66
Int. Cl. A01g 9/02, 9/10; B65d 5/48
U.S. Cl. 47—34.13     6 Claims

ABSTRACT OF THE DISCLOSURE

A multiple plant propagation device in which a side section is hingeably connected at an end thereof to the base of an inverted T-shaped section for movement between an upright position, in which the side section is engageable with the upstanding wall and a lowered open position. The side section includes a plurality of spaced walls thereon which in the lowered position define a succession of U-shaped channel sections for the side section and in the upright position define with the base and wall of the T-shape section isolated compartments with open upper ends.

---

This invention relates to tubes or pots used for plant propagation.

The present practice in the propagation of seedlings and cuttings is to use cylindrical tubes of about 1½ to 2 inches in diameter. These tubes suffer from the disadvantages that the plant with the dirt round its root structure is not easily removed without damage thereto and also, such tubes are not suitable for manufacture in packs of several tubes.

This invention has for its object the production of a propagation tube or pot which does not have the above mentioned disadvantages.

The invention in its broadest form comprises a plant propagation pot comprising a base section and a side section wherein part of the side section or the base section and part of the side section is movable relative to the remainder of the pot thereby exposing the bottom and part of the side of the contents of the pot.

Several forms of the basic inventive concept are envisaged, said forms being illustrated in the accompanying drawings in which.

Figure 1:
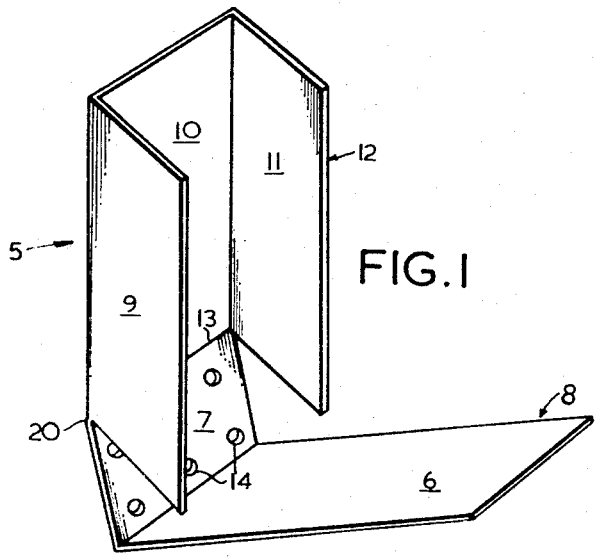
FIGURE 1 is a perspective view of a first unitary form of the pot with a hinged base and side wall.

In one form shown in FIGURE 1 the pot 5 may be roughly square in cross-section with one side wall 6 and the base 7 rigidly fixed together forming an L-shaped section 8. The other three walls 9, 10 and 11 which form a channel 12 are hinged to the base 7 by the bottom edge 13 of the middle wall 10 of the three walls. The base 7 is usually provided with drain holes 14. In this arrangement, in the closed position of the pot 5, the outer two walls 9 and 10 of the channel section 12 abut the base 7 and the side wall 6 of the L-shaped section, to form a tubular container or pot 5. This can be filled with dirt and a seed or cutting (not shown) planted therein. When it is necessary to remove the plant the channel section 12 is rotated away from the L-shaped section 8 or vice versa, and the contents of the pot 5 remains in the channel section 12. The bottom 7 and one side 6 of the pot 5 are then open and the plant is simply removed from the pot 5.

Figure 3:
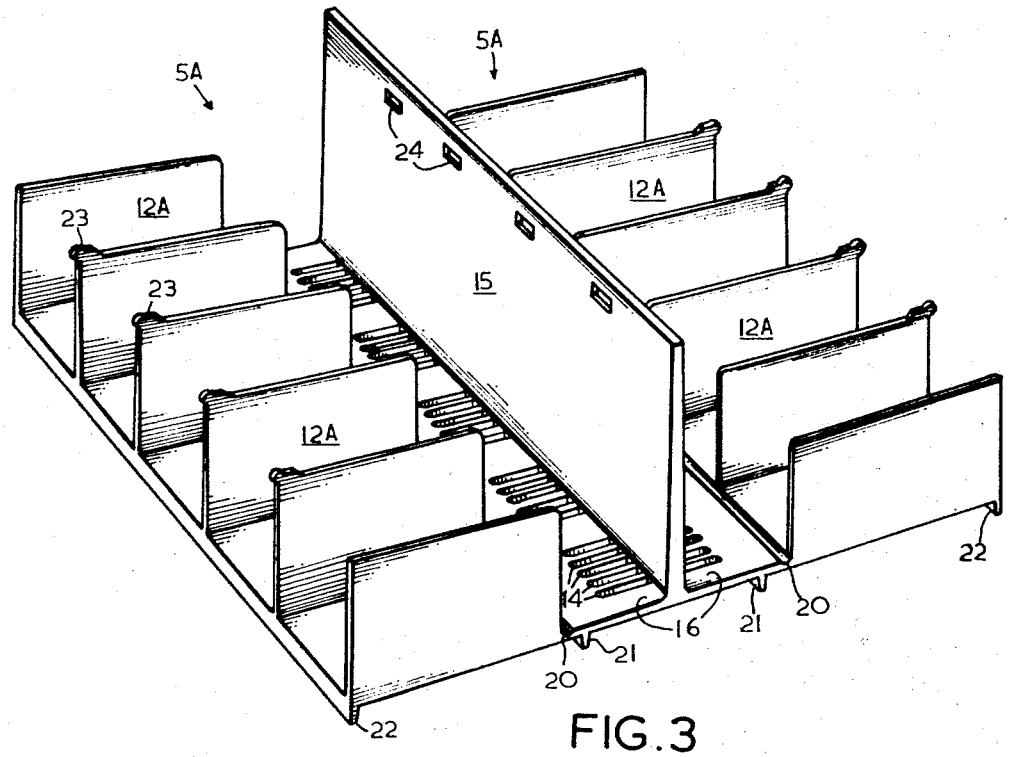
FIGURE 3 is a perspective view of a third and preferred form of multiple pot wherein the side walls are hingedly secured to an integral base.
Figure 4:
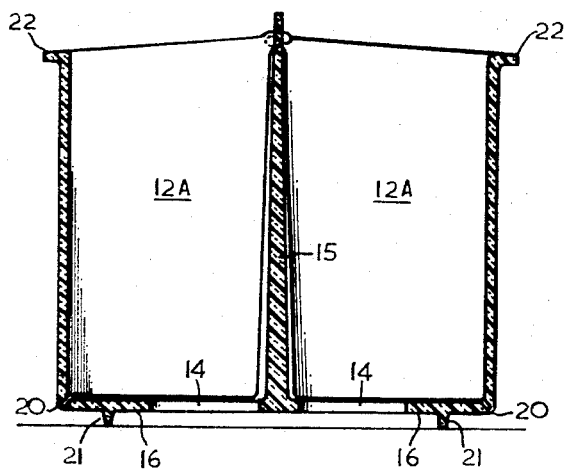
FIGURE 4 is an end elevation in half vertical section of the form illustrated in FIGURE 3.

This arrangement lends itself to the production of multiple pot packs 5A as shown in FIGURES 3 and 4. The fixed wall 15 and base 16 are extended in length to accommodate say five or six pots. A series of channel shaped sections 12A are hinged to the base 16 so that in the closed position a pack of several pots 5A is formed. It is also envisaged that a second row of pots 5A are formed in a similar manner on the other side of the fixed side wall 15. The channel sections 12A may be formed integrally.

Figure 2:
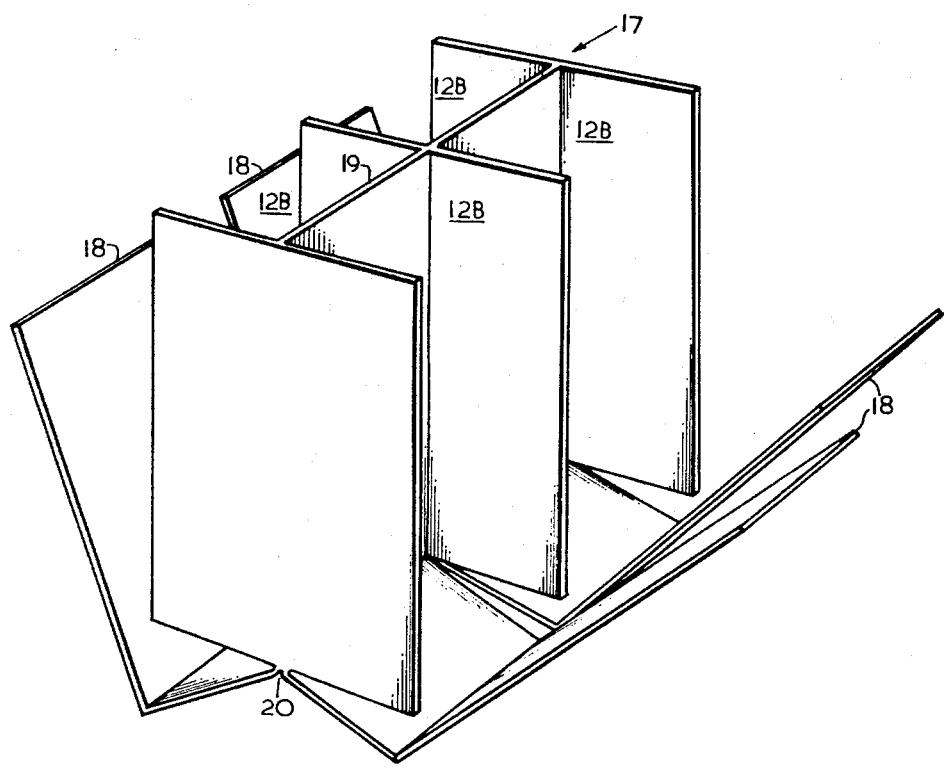
FIGURE 2 is a perspective view of a second multiple form of integrally constructed pots with hinged bases and side walls.

Various other arrangements of the basic concept are possible for instance, as shown in FIGURE 2 a double row of channel sections 12B which forms a row of H-sections 17, L-shaped sections 18 hinged at near the bottom of the common wall 19 between the two rows of channel sections 12B.

In this way the L-shaped sections 18 would "wrap around" the channel sections 12B to form a pack of pots.

The pots of the invention may be made out of any suitable material; they may be fabricated or moulded and they are of suitable configuration to be moulded in one piece or operation. The material of the pack is adapted to be hinged at 20 between the movable and non-movable parts of the pack.

Further refinements are the provision of legs 21 or the like to raise the base 16 to allow better drainage; and the provision of a lip or groove 22 along an outer edge of the base section and/or side section to permit storage or carriage in a suitable container such as a wire basket or crate.

All embodiments may be provided with suitable means such as tongues 23 and slots 24 for fastening the pots in their closed positions.

For transport to shops and the like the packs are stacked in basket like containers or crates.

These containers comprise a wire framework usually of rectangular box shape, and having runners therein so spaced to receive several packs of the invention and retain them and the plants therein in a suitable position for transport. It is usually arranged that the lips of the packs cooperate with the runners of the container to support the packs inside the container. The containers are adapted for stacking one upon the other.

The combination of the pack of pots and the containers is suitable for both transport and display purposes.

What I claim is:

1. A multiple plant propagation device comprising a base, an upstanding wall on said base forming an inverted T-shape section therewith, an integral side section hingeably connected to said base for movement between an upright position in which the side section is engageable with the upstanding wall and a lowered open position, said side section including a plurality of spaced walls thereon which define a succession of contiguous, open U-shaped channel sections for said side section, each of said walls being common to adjacent sections, said side section in upright position defining with the base and upstanding wall isolated compartments with open upper ends, whereby when the side section is moved to its lowered position, the bottom and one side of any contents in each channel section is exposed, tongue means on said sidewalls substantially coplanar therewith and slot means in said upstanding wall for detachably engaging said tongue means when the side section is in upright position.

2. A device as claimed in claim 1 wherein said T-shaped section and side section are constituted as a single moulded member.

3. A device as claimed in claim 2 comprising a second side section hingeably connected to said base at an end thereof opposite that at which the first side section is connected.

4. A device as claimed in claim 3 wherein each side section includes a lip thereon at an edge remote from its hingeable connection to said base whereby the lip can rest on a supporting surface in the open position of the side section.

5. A device as claimed in claim 4 comprising legs on said base to support the latter in spaced relation above said supporting surface.

6. The device as claimed in claim 5 wherein said base is provided with drain apertures therein.

References Cited

UNITED STATES PATENTS

| 2,318,711 | 5/1943 | Phelan | 47—34.13 |
|---|---|---|---|
| | | Blackmore | 47—34.13 |

FOREIGN PATENTS

| 712,041 | 7/1954 | Great Britain. |
|---|---|---|
| 1,307,886 | 9/1962 | France. |

ROBERT E. BAGWILL, *Primary Examiner.*

U.S. Cl. X.R.

206—45.17; 229—28